(12) United States Patent
Kim

(10) Patent No.: US 8,215,609 B2
(45) Date of Patent: Jul. 10, 2012

(54) FLOW CONTROL VALVE ASSEMBLY WITH LOW NOISE

(75) Inventor: Hun Ki Kim, Seoul (KR)

(73) Assignee: Hun Ki Kim, Seoul (KR)

( * ) Notice: Subject to any disclaimer, the term of this patent is extended or adjusted under 35 U.S.C. 154(b) by 60 days.

(21) Appl. No.: 12/600,213

(22) PCT Filed: Apr. 8, 2008

(86) PCT No.: PCT/KR2008/001966
§ 371 (c)(1),
(2), (4) Date: Jul. 29, 2010

(87) PCT Pub. No.: WO2008/140189
PCT Pub. Date: Nov. 20, 2008

(65) Prior Publication Data
US 2011/0057135 A1    Mar. 10, 2011

(30) Foreign Application Priority Data
May 16, 2007    (KR) .................. 10-2007-0047828

(51) Int. Cl.
*F16K 7/04*    (2006.01)
(52) U.S. Cl. ................................ 251/8; 251/7
(58) Field of Classification Search .................. 251/4, 7, 251/8, 318
See application file for complete search history.

(56) References Cited

U.S. PATENT DOCUMENTS

| | | | |
|---|---|---|---|
| 1,683,322 A | 6/1926 | Annis | |
| 1,761,721 A | 6/1930 | Gipe | |
| 3,588,034 A | 6/1971 | Powell | |
| 3,826,461 A * | 7/1974 | Summerfield et al. | 251/7 |
| 4,044,990 A * | 8/1977 | Summerfield | 251/8 |
| 4,303,222 A * | 12/1981 | Campbell | 251/7 |
| 4,322,054 A * | 3/1982 | Campbell | 251/5 |

(Continued)

FOREIGN PATENT DOCUMENTS

DE    1960102    6/1971

(Continued)

OTHER PUBLICATIONS

Hansjurgen Saechtling, Kunststoff Taschenbuch; 22 Ausgabe; Carl Hanser Verlag Munchen Wien: Carl Hanser Verlag, 1983, S. 444 bis 447.

*Primary Examiner* — John Fristoe, Jr.
*Assistant Examiner* — Andrew J Rost
(74) *Attorney, Agent, or Firm* — Workman Nydegger

(57) ABSTRACT

A flow control valve assembly with low noise is provided. The flow control valve assembly uses silicone to define a flow passage to reduce the friction with respect to a fluid flowing therethrough while preventing the occurrence of turbulent flow of the fluid, thereby minimizing the generation of noise. The flow control valve assembly comprises a pipe having a through hole therein and formed with a plunger guide on a lateral surface thereof, a plunger installed within the plunger guide of the pipe to move upwardly and downwardly along the plunger guide, a silicone wall installed on the inner surface of the pipe to define a flow passage in the middle thereof, a clamping joint installed at the inlet of the pipe to clamp the silicone wall to the pipe, and a stopping joint installed at the outlet of the pipe to prevent the silicone wall from being thrust out of the pipe.

7 Claims, 3 Drawing Sheets

U.S. PATENT DOCUMENTS

| | | | |
|---|---|---|---|
| 4,357,406 A | 11/1982 | Kouchi | |
| 4,518,145 A * | 5/1985 | Keltz et al. | 251/5 |
| 4,877,053 A | 10/1989 | Yusko, Jr. et al. | |
| 5,316,261 A | 5/1994 | Stoner | |
| 5,351,932 A | 10/1994 | Von Herrmann | |
| 5,992,818 A * | 11/1999 | Jones et al. | 251/7 |
| 6,755,338 B2 | 6/2004 | Hahnen et al. | |
| 7,255,321 B2 * | 8/2007 | Tomioka et al. | 251/5 |

FOREIGN PATENT DOCUMENTS

| | | |
|---|---|---|
| DE | 60112893 | 6/2006 |
| GB | 191212187 | 0/1913 |
| JP | 50-135615 | 10/1975 |
| JP | 54119928 | 9/1979 |
| JP | 1980-145763 | 10/1980 |
| JP | 02-084071 | 6/1990 |
| JP | 03-086257 | 8/1991 |
| JP | 2002-174352 | 6/2002 |
| KR | 10-1994-0015335 | 7/1994 |
| WO | 2005071295 | 8/2005 |

* cited by examiner

[Fig. 1]
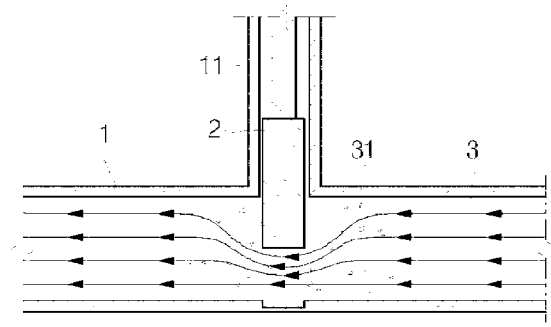
[Fig. 2]
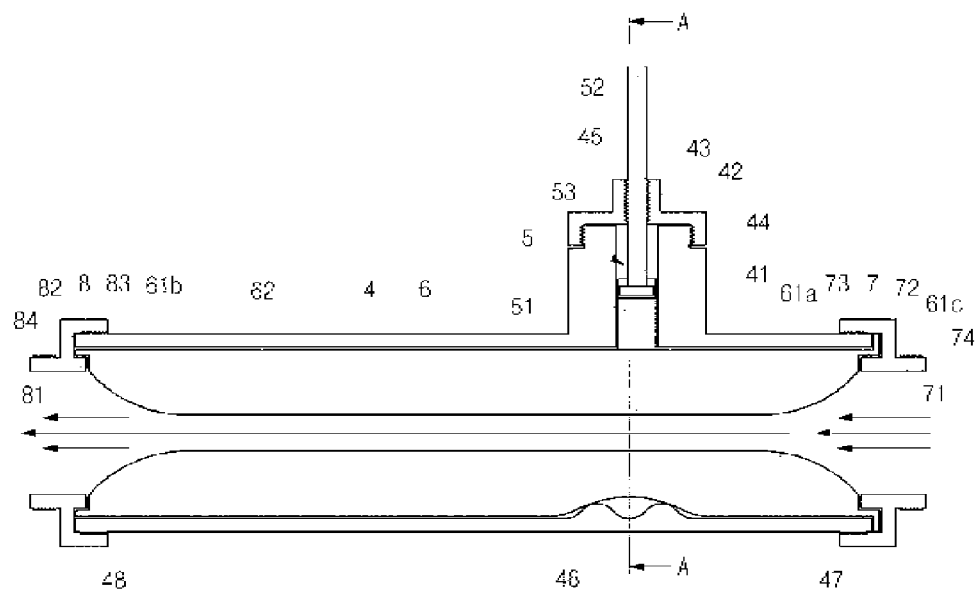
[Fig. 3]
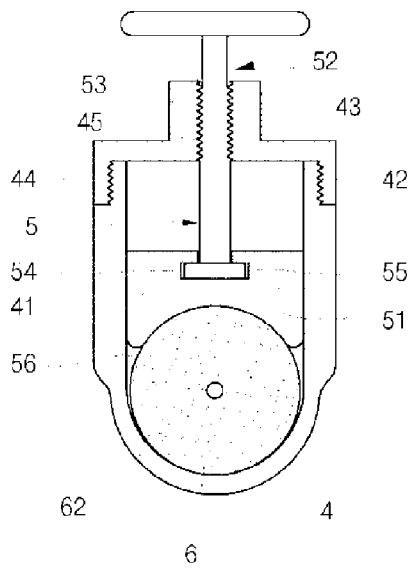

[Fig. 4]
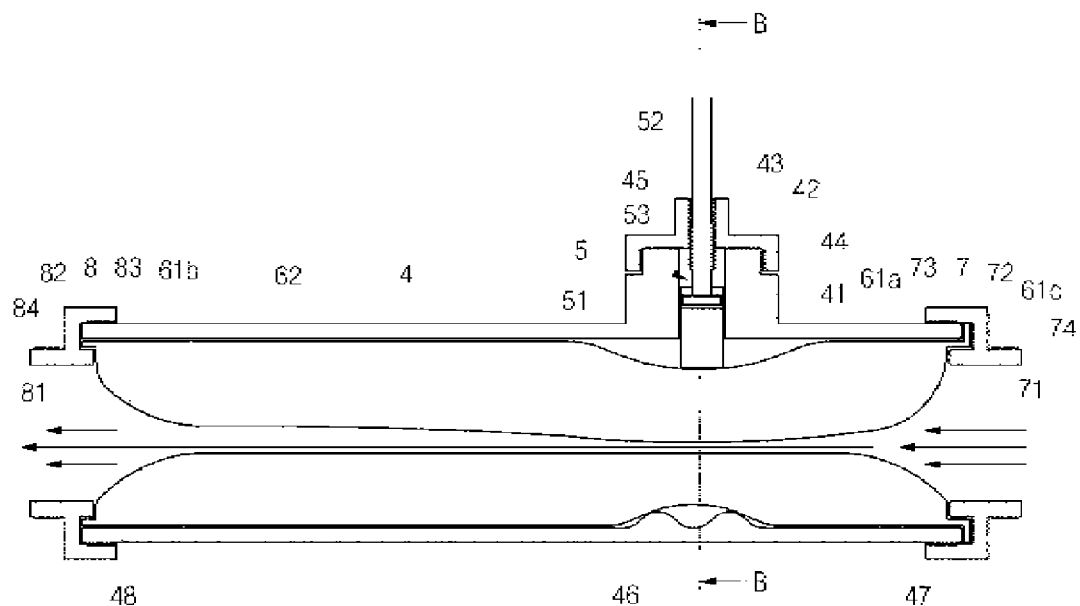
[Fig. 5]
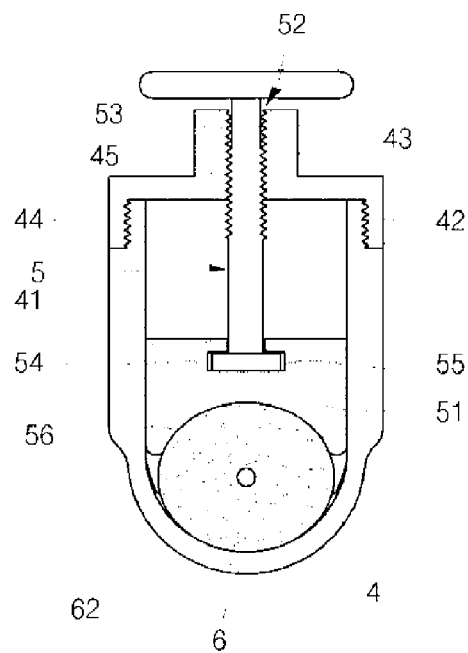

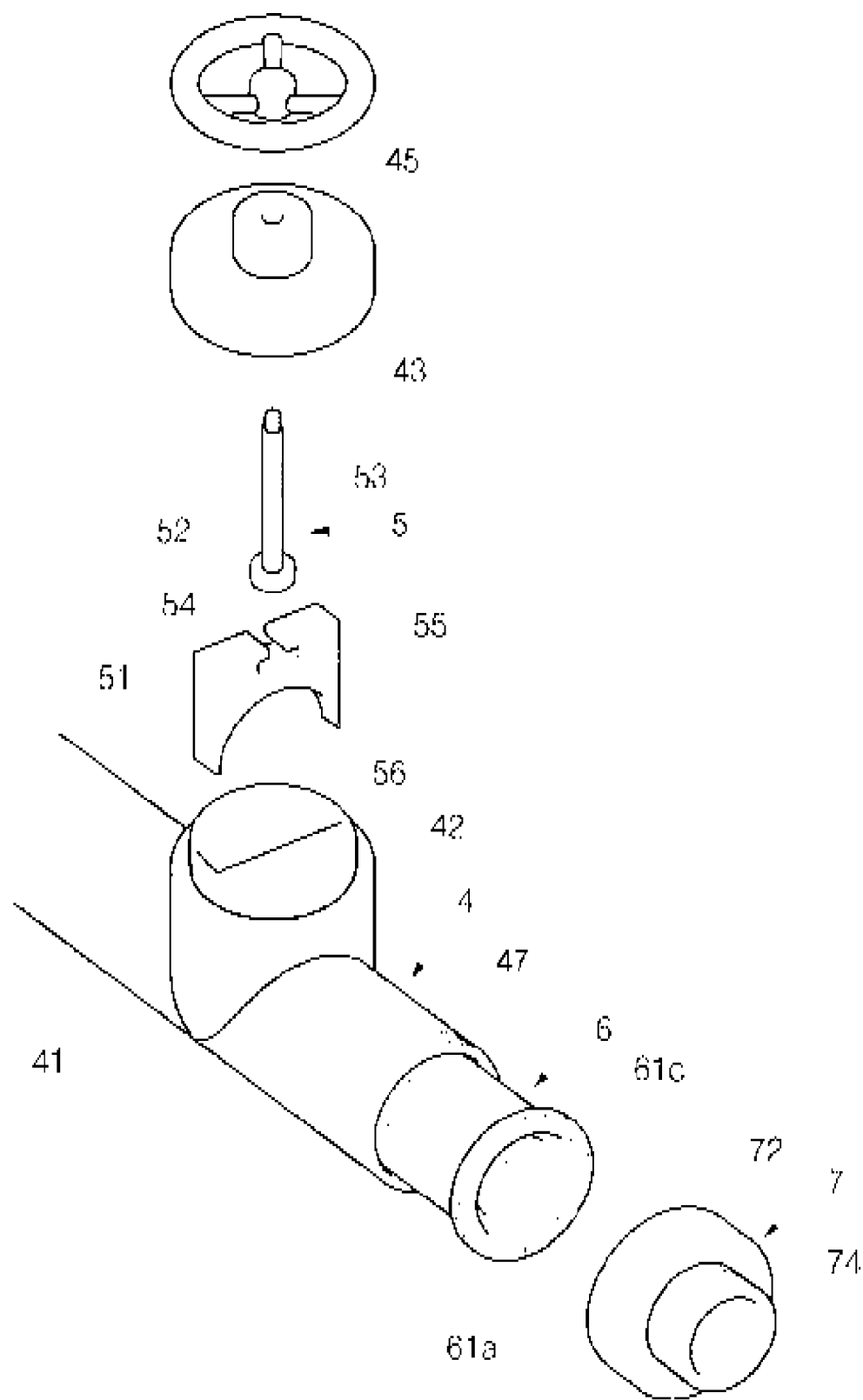
[Fig. 6]

FLOW CONTROL VALVE ASSEMBLY WITH LOW NOISE

TECHNICAL FIELD

The present invention relates to a valve, and more specifically to a flow control valve assembly with low noise in which a flow passage is defined by a silicone wall to reduce the friction with respect to a fluid flowing therethrough while preventing the occurrence of turbulent flow of the fluid, thereby minimizing the generation of noise.

BACKGROUND ART

Flow control valve assemblies are typically used to supply/block fluids (including gases and liquids) flowing therethrough or to regulate the flow rate of fluids supplied therein. Depending on the type of control power sources employed, flow control valve assemblies are broadly classified into manual control valve assemblies opened/closed by human power and electronic control valve assemblies opened/closed by an electric force.

FIG. 1 is a cross-sectional view showing the constitution of a prior art flow control valve assembly.

As shown in FIG. 1, the flow control valve assembly comprises a pipe 1 having a flow passage through which a fluid 3 flows and formed with a plunger guide 11 on a lateral surface thereof, and a plunger 2 installed within the plunger guide 11 of the pipe 1 and moving upwardly and downwardly along the plunger guide 11 to block the flow of the fluid 3 or allow the fluid 3 to flow through the pipe 1.

Due to this configuration of the flow control valve assembly, the plunger 2 moves downwardly along the plunger guide 11 to block the flow of the fluid 3 through the pipe 1 and moves upwardly along the plunger guide 11 to allow the fluid 3 to flow through the pipe 1.

A problem of the flow control valve assembly is that when the plunger 2 actuates in a direction perpendicular to the flow of the fluid 3 to regulate the flow of the fluid 3, a large difference in the pressure of the fluid 3 at both sides of the plunger 2 is caused, which results in the occurrence of a vortex and bubbles 31 in front and in the rear of the plunger 2 to create tremendous noises. Such noises are particularly more serious in multi-residential and high-density facilities. Thus, there is a need to reduce the generation of noises from flow control valve assemblies.

Many attempts have been made to solve the above problem. For example, Korean Registered Utility Model No. 20-0360750, which was published on Sep. 1, 2004, discloses a low-noise flow control valve in which a plunger is configured to have the same spherical shape as a flow passage so that a moderate flow of a fluid is induced by the rounded shape of the flow passage to reduce the friction with respect to the fluid, which is a cause of noise generation when the flow of the fluid is regulated, and to prevent the occurrence of turbulent flow, thereby ensuring the operation of the valve with low noise generation.

The fluid gently flows at the contact surface with the plunger when the flow of the fluid is regulated to contribute to the reduction of the friction with respect to the fluid and the prevention of turbulent flow of the fluid. However, noise from the flow control valve is not completely removed and is inevitably generated to some extent.

DISCLOSURE OF INVENTION

Technical Problem

The present invention has been made in an effort to solve the problems of the prior art, and it is an object of the present invention to provide a flow control valve assembly that uses silicone to define a flow passage to reduce the friction with respect to a fluid flowing therethrough while preventing the occurrence of turbulent flow of the fluid, thereby minimizing the generation of noise.

Technical Solution

In order to accomplish the above object of the present invention, there is provided a flow control valve assembly with low noise, comprising a pipe having a through hole therein and formed with a plunger guide on a lateral surface thereof, a plunger installed within the plunger guide of the pipe to move upwardly and downwardly along the plunger guide, a silicone wall installed on the inner surface of the pipe to define a flow passage in the middle thereof, a clamping joint installed at the inlet of the pipe to clamp the silicone wall to the pipe, and a stopping joint installed at the outlet of the pipe to prevent the silicone wall from being thrust out of the pipe.

In a preferred embodiment, the flow control valve assembly further comprises a guide cap installed on the plunger guide to be couplable to and separable from the plunger guide.

In a preferred embodiment, the plunger consists of a lower head and an upper rod, and has a groove formed at an upper end of the head and a flange part formed on the lower surface of the rod so that the head and the rod are separated from or coupled to each other to deliver the lengthwise movement of the rod to the head without delivering the rotational force of the rod to the head.

In a preferred embodiment, the head is configured to have substantially the same width as the diameter of the circular cross section of the cylindrical silicone wall, be installed perpendicular to the lengthwise direction of the silicone wall, and have a semicircular lower portion to evenly pressurize the silicone wall toward the center of the circular cross section of the silicone wall.

In a preferred embodiment, the pipe has a supporting portion protruding from a lower inner surface thereof opposite to a portion where the guide cap is installed to pressurize the silicone wall in response to the movement of the plunger.

In a preferred embodiment, the silicone wall has an inlet and an outlet at both ends of the flow passage formed in the middle thereof, each of the inlet and the outlet having a radius larger than that of the flow passage.

In a preferred embodiment, the clamping joint has a stepped portion to pressurize the silicone wall.

Advantageous Effects

The flow control valve assembly of the present invention uses silicone to define a flow passage to reduce the friction with respect to a fluid flowing therethrough while preventing the occurrence of turbulent flow of the fluid. As a result, the generation of noise from the flow control valve assembly can be effectively minimized.

BRIEF DESCRIPTION OF THE DRAWINGS

FIG. 1 is a cross-sectional view showing the constitution of a prior art flow control valve assembly;

FIG. 2 is a cross-sectional view showing the constitution of a low-noise flow control valve assembly according to an embodiment of the present invention in an open position;

FIG. 3 is a cross-sectional view taken along line A-A of FIG. 1;

FIG. 4 is a cross-sectional view showing the constitution of a low-noise flow control valve assembly according to an embodiment of the present invention when the flow of a fluid through the flow control valve assembly is regulated;

FIG. 5 is a cross-sectional view taken along line B-B of FIG. 4; and

FIG. 6 is an exploded perspective view of a low-noise flow control valve assembly according to an embodiment of the present invention.

MODE FOR THE INVENTION

The most preferred embodiments of the present invention will now be described in detail with reference to the accompanying drawings in such a manner that they can be readily carried out by those having ordinary skill in the technical art to which the invention pertains. Additional objects, features and operational advantages, including the object, constitution and effects of the present invention, will become more apparent from the detailed description of the preferred embodiments.

It should be understood that the most preferred embodiments of the present invention are proposed to assist in a further understanding of the invention and are not necessarily intended to restrict or limit the spirit of the invention. Thus, those skilled in the art will appreciate that various modifications, additions, variations and their equivalents are possible, without departing from the scope and spirit of the invention as disclosed in the accompanying claims.

FIG. 2 is a cross-sectional view showing the constitution of a low-noise flow control valve assembly according to an embodiment of the present invention in an open position, FIG. 3 is a cross-sectional view taken along line A-A of FIG. 1, FIG. 4 is a cross-sectional view showing the constitution of a low-noise flow control valve assembly according to an embodiment of the present invention when the flow of a fluid through the flow control valve assembly is regulated, FIG. 5 is a cross-sectional view taken along line B-B of FIG. 4, and FIG. 6 is an exploded perspective view of a low-noise flow control valve assembly according to an embodiment of the present invention.

As shown in FIGS. 2 through 6, the flow control valve assembly comprises a pipe 4 having a through hole therein and formed with a plunger guide 41 in a direction perpendicular to the lengthwise direction thereof, a plunger 5 installed within the plunger guide of the pipe to move upwardly and downwardly along the plunger guide 41, a silicone wall 6 installed on the inner surface of the pipe 4 to define a flow passage 62 in the middle thereof, a clamping joint 7 installed at the inlet of the pipe 4 to clamp the silicone wall 6 to the pipe 4, and a stopping joint 8 installed at the outlet of the pipe 4 to prevent the silicone wall 6 from being thrust out of the pipe 4.

A guide cap 43 is installed on the plunger guide 41 of the pipe 4 so as to be couplable to and separable from the plunger guide 41. A first threaded portion 42 is formed along the outer circumference of the upper end of the plunger guide 41 and a second threaded portion 44 is formed along the inner circumference of the lower end of the guide cap 43 so that the plunger guide 41 and the guide cap 43 can be coupled to and separated from each other by means of the threads. Further, a third threaded portion 45 is formed along the inner circumference of the upper end of the guide cap 43 so that the guide cap 43 and a rod 52 of the plunger 5 can be coupled to and separated from each other by means of the threads. The pipe 4 has a supporting portion 46 protruding from a lower inner surface thereof opposite to a portion where the guide cap 43 is installed to pressurize the silicone wall 6 in response to the movement of the plunger 5. The supporting portion 46 is in the shape of an M whose bent portions are smoothly rounded. Alternatively, the supporting portion 46 may have an inverted triangle shape whose bent portions are smoothly rounded. A fourth threaded portion 47 and a fifth threaded portion 48 are formed at both right and left ends of the pipe 4 to be coupled to the clamping joint 7 and the stopping joint 8, respectively.

The plunger 5 consists of a lower head 51 and an upper rod 52, and has a groove 55 formed at an upper end of the head 51 and a flange part 54 provided on the lower surface of the rod 52 so that the head 51 and the rod 52 can be separated from or coupled to each other to deliver the lengthwise movement of the rod 52 to the head 51 without delivering the rotational force of the rod 52 to the head 51. The head 51 is configured to have substantially the same width as the diameter of the circular cross section of the cylindrical silicone wall 6, be installed perpendicular to the lengthwise direction of the silicone wall 6, and have a semicircular lower portion 56 to evenly pressurize the silicone wall 6 toward the center of the circular cross section of the silicone wall 6. A sixth threaded portion 53 is formed along the outer circumference of an upper portion of the rod 52 to be coupled to and separated from the third threaded portion 45 formed along the inner circumference of the upper end of the guide cap 43, so that the rod 52 and the guide cap 43 can be coupled to and separated from each other by means of the threads. Accordingly, the rod 52 can be separated from the guide cap 43 by separating the guide cap 43 and the head 51 from the plunger guide 41 and the rod 52, respectively.

The silicone wall 6 has an inlet 61a and an outlet 61b at both ends of the flow passage 62 formed in the middle thereof, each of the inlet 61a and the outlet 61b having a radius larger than that of the flow passage 62. Each of the inlet 61a and the outlet 61b has a trumpet shape whose radius increases exponentially. Alternatively, each of the inlet 61a and the outlet 61b may be tapered such that the radius increases linearly. A latching portion 61c is formed at the end of the inlet 61a of the silicone wall 6 to allow the silicone wall 6 to be latched to the pipe 4.

A seventh threaded portion 73 is formed at an inner end of the clamping joint 7 to be couplable to and separable from the fourth threaded portion 47 formed at the inlet of the pipe 4. The clamping joint 7 has a stepped portion 72 formed at the rear side of the seventh threaded portion 73 to pressurize the latching portion 61c of the silicone wall 6. The clamping joint 7 includes an eighth threaded portion 74 formed along the outer circumference of an opposite end of the seventh threaded portion 73 to be couplable to and separable from an adjacent pipe (not shown). The clamping joint 7 has a protrusion 71 protruding inwardly towards the interior of the pipe 4 from the inner end of the stepped portion 72 to firmly connect the silicone wall 6 to the pipe 4 and seal the connected portion between the silicone wall 6 and the pipe 4.

A ninth threaded portion 83 is formed at an inner end of the stopping joint 8 to be couplable to and separable from the fifth threaded portion 48 formed at the outlet of the pipe 4. The stopping joint 8 has a stepped portion 82 formed in front of the ninth threaded portion 83 to support the outlet 61b of the silicone wall 6 so as not to be thrust out of the pipe 4. The stopping joint 8 includes a tenth threaded portion 84 formed along the outer circumference of an opposite end of the ninth threaded portion 83 to be couplable to and separable from another adjacent pipe (not shown). The stopping joint 8 has a protrusion 81 protruding inwardly towards the interior of the pipe 4 from the inner end of the stepped portion 82 to firmly connect the silicone wall 6 to the pipe 4 and seal the connected portion between the silicone wall 6 and the pipe 4.

Based on this configuration, the operation of the low-noise flow control valve assembly will be described below.

As shown in FIGS. 2 and 3, in an open position of the flow control valve assembly, the upper portion of the silicone wall 6 is not pressurized by the lower portion 56 of the head 51 of the plunger 5 and the original circular shape of the silicone wall 6 is maintained in cross section such that the fluid flows through the flow passage 62 formed in the middle of the silicone wall 4.

Herein, when an operator rotates the rod 52 of the plunger 5 in a clockwise direction to reduce the amount of the fluid flowing through the flow passage 62, the rod 52 moves downward while rotating by the action of the sixth threaded portion 53 of the rod 52 and the third threaded portion 45 of the guide cap 43. At this time, the forward movement of the rod 52 is delivered to the head 51. The flange part 54 provided on the lower surface of the rod 52 is coupled to the groove 55 of the head 51 so that the forward movement of the rod 52 in the downward direction is delivered to the head 51 but the rotational movement of the rod 52 is not delivered to the head 51. As a result, the upper portion of the silicone wall 6 is pressurized by the semicircular lower portion 56 of the head 51. As shown in FIGS. 4 and 5, the silicone wall 6 is evenly pressurized toward the center of the circular cross section of the silicone wall 6 by the semicircular lower portion 56 of the head 51, resulting in a reduction in the flow of the fluid through the flow passage 62. Due to the inherent characteristics (e.g., elasticity) of the material (i.e. silicone) for the silicone wall 6, the flow passage 62 is substantially uniformly narrowed toward the center in all directions.

At this time, the supporting portion 46 formed on a lower inner surface of the pipe 4 serves to support and pressurize the silicone wall 6 in response to the movement of the plunger 5.

When the flow passage 62 is narrowed to reduce the flow of the fluid therethrough, the flow pressure of the fluid applied to the silicone wall 6 increases. The radius of the inlet 61a is gradually narrowed without a sudden change because the inlet 61a has a trumpet shape or is tapered. This structure allows the inlet 61a to act as a buffer for the flow pressure of the fluid entering the flow passage 62. Further, the latching portion 61c of the silicone wall 6 is held by the stepped portion 72 of the clamping joint 7 to prevent the silicone wall 6 from being thrust in the moving direction of the fluid by the flow pressure of the fluid. Also, the radius of the outlet 61b is gradually widened without a sudden change because the outlet 61b has a trumpet shape or is tapered. This structure allows the outlet 61b to act as a buffer for the flow pressure of the fluid escaping from the flow passage 62. Further, the stepped portion 82 of the stopping joint 8 serves to prevent the silicone wall 6 from being thrust out of the pipe 4 (i.e. in the moving direction of the fluid) by the flow pressure of the fluid.

In conclusion, since the flow passage 62 is substantially uniformly narrowed due to the inherent characteristics of the material for the silicone wall 6 and the inlet 61a and the outlet 61b serve as buffers for the flow pressure of the fluid, the friction with respect to the fluid is reduced and the occurrence of turbulent flow is prevented despite a reduction in the flow of the fluid through the flow passage 62 of the silicone wall 6. As a result, the generation of noise from the flow control valve assembly is minimized.

When it is intended to exchange the plunger 5 with a new one after long-term use, the plunger 5 is separated from the guide cap 43 by decoupling the first threaded portion 42 of the plunger guide 41 of the pipe 4 from the second threaded portion 44 of the guide cap 43 to separate the plunger guide 41 from the guide cap 43 installed on the plunger guide 41, and separating the head 51 and the rod 52 of the plunger 5 from each other.

When it is intended to exchange the silicone wall 6 with a new one after long-term use, the silicone wall 6 is separated from the pipe 4 by decoupling the seventh threaded portion 73 of the clamping joint 7 coupled to the fourth threaded portion 47 of the pipe 4 or the ninth threaded portion 93 of the stopping joint 8 coupled to the fifth threaded portion 48 of the pipe 4 to separate the clamping joint 7 or the stopping joint 8 from the pipe 4.

The invention claimed is:

1. A flow control valve assembly with low noise, the flow control valve assembly comprising:
  a pipe having a through hole therein with a plunger guide formed on a lateral surface thereof;
  a plunger installed within the plunger guide of the pipe which is capable of moving upwardly and downwardly along the plunger guide, wherein the plunger consists of a lower head and an upper rod, and has a groove formed at an upper surface of the lower head and a flange part formed on a lower surface of the upper rod so that the lower head and the upper rod are capable of being separated from or coupled to each other to deliver a lengthwise movement of the upper rod to the lower head without delivering a rotational force of the upper rod to the lower head;
  a silicone wall installed on an inner surface of the through hole of the pipe to define a flow passage in the middle thereof, wherein the lower head is configured to have substantially the same width as a diameter of a circular cross section of the silicone wall which has a cylindrical shape, and wherein the lower head is installed perpendicular to a lengthwise direction of the silicone wall, and has a semicircular lower portion so as to evenly pressurize the silicone wall toward a center of the circular cross section of the silicone wall when the semicircular lower portion of the lower head is pressed toward the silicone wall,
  a clamping joint installed at an inlet of the through hole of the pipe to clamp the silicone wall to the through hole of the pipe; and
  a stopping joint installed at an outlet of the through hole of the pipe to prevent the silicone wall from being thrust out of the through hole of the pipe.

2. The flow control valve assembly according to claim 1, further comprising a guide cap installed on the plunger guide which is capable of being coupled and separated from the plunger guide.

3. The flow control valve assembly according to claim 2, wherein the pipe has a supporting portion protruding from a lower inner surface thereof opposite to a portion where the guide cap is installed to pressurize the silicone wall in response to the movement of the plunger.

4. The flow control valve assembly according to claim 2, wherein the silicone wall has an inlet and an outlet at both ends of the flow passage formed in the middle thereof, each of the inlet and the outlet of the silicone wall having a radius larger than that of the flow passage.

5. The flow control valve assembly according to claim 2, wherein the clamping joint has a stepped portion so as to pressurize the silicone wall.

6. The flow control valve assembly according to claim 1, wherein the silicone wall has an inlet and an outlet at both ends of the flow passage formed in the middle thereof, each of the inlet and the outlet of the silicone wall having a radius larger than that of the flow passage.

7. The flow control valve assembly according to claim 1 wherein the clamping joint has a stepped portion so as to pressurize the silicone wall.

* * * * *